United States Patent [19]
Sarkar

[11] Patent Number: 6,012,067
[45] Date of Patent: Jan. 4, 2000

[54] METHOD AND APPARATUS FOR STORING AND MANIPULATING OBJECTS IN A PLURALITY OF RELATIONAL DATA MANAGERS ON THE WEB

[76] Inventor: Shyam Sundar Sarkar, 273 Laurie Meadows Dr., Apartment #142, San Mateo, Calif. 94403

[21] Appl. No.: 09/033,325

[22] Filed: Mar. 2, 1998

[51] Int. Cl.$^7$ .................................................. G06F 17/30
[52] U.S. Cl. ........................ 707/103; 707/10; 707/104; 707/201; 709/229; 709/203; 713/201; 713/200; 395/500.24; 395/500.25
[58] Field of Search .................................. 713/201, 200; 709/229, 203; 395/500.25, 500.24; 707/104, 10, 201, 103

[56] References Cited

U.S. PATENT DOCUMENTS

| | | | |
|---|---|---|---|
| 5,517,645 | 5/1996 | Stutz et al. ............................... | 395/700 |
| 5,613,148 | 3/1997 | Bezviner et al. ........................ | 395/800 |
| 5,694,598 | 12/1997 | Durand et al. ........................... | 707/103 |
| 5,706,506 | 1/1998 | Jensen et al. ............................ | 707/103 |
| 5,706,507 | 1/1998 | Schloss .................................... | 707/103 |
| 5,708,780 | 1/1998 | Levergood et al. ............... | 395/200.12 |
| 5,712,979 | 1/1998 | Graber et al. . | |
| 5,715,399 | 2/1998 | Bezos ..................................... | 395/227 |
| 5,717,911 | 2/1998 | Madrid et al. ............................. | 707/2 |
| 5,717,924 | 2/1998 | Kawai .................................... | 707/102 |
| 5,815,415 | 9/1998 | Bentley et al. ..................... | 395/500.25 |
| 5,857,201 | 1/1999 | Wright et al. ........................... | 707/104 |
| 5,870,544 | 2/1999 | Curtis ..................................... | 713/201 |
| 5,881,230 | 3/1999 | Christensen et al. ................... | 709/203 |
| 5,913,061 | 6/1999 | Gupta et al. ............................ | 709/300 |
| 5,915,085 | 6/1999 | Koved .................................... | 713/200 |

OTHER PUBLICATIONS

David Ritter, "The Middleware Muddle", DBMS, May 1998.

Oracle 8 Server SQL Reference (Release 8.0, vol. 1 & 2 ), 1997.

Extending Informix—Universal Server: Data Types, Version 9.1, Mar. 1997.

Extending Informix—Universal Server: User–Defined Routines, Version 9.1, Mar. 1997.

*Primary Examiner*—Thomas G. Black
*Assistant Examiner*—Jean M. Corrielus

[57] ABSTRACT

The present invention provides a system for the retrieval, construction and manipulation of any kind of objects using Structured Query Language (SQL) over disparate relational storage systems on the web. Uniform Resource Locators (URLs) are used by the present invention to locate objects corresponding to component relational databases on the web and other web objects. URLs locating relational schema components and other web objects are stored as attribute values in tables. Object methods and operators on such web objects are defined as part of user defined type definition for an attribute type in a table. Object request brokers apply such methods or operators on web objects anywhere on the web. Since URLs can point to relational data store under a remote schema definition, a business application logic in the form of object package is executed after constructing proper sets of records by relational operations at the remote schema location. This leads to partitioning of a logical schema into many physical schema components with business objects. Also by this invention, parts of a web object can be intelligently manipulated and access methods through index creation enable range access over web objects. Additionally, this invention suggests possible internet security by authorizations at component schema locations and by further maintaining processing logic for secured transmission over the internet. SQL queries create, retrieve and manipulate disparate web objects with implicit or explicit calls to business application logic as object methods. This invention uniquely incorporates a cooperative method of preparation, execution and resolution of a SQL query manipulating uniform resource locators and object definitions at multiple locations on the web.

14 Claims, 11 Drawing Sheets

METHOD AND APPARATUS FOR STORING AND MANIPULATING OBJECTS IN A PLURALITY OF RELATIONAL DATA MANAGERS ON THE WEB

BACKGROUND OF THE INVENTION

1. Field of the Invention

This invention relates to object management in relational database systems for storing and manipulating any kind of data on internet. With the advancement of internet and world wide web, a large number of different types of objects (text, file, audio, video, image as well as relational data) are being created everyday. One can look at internet as a huge database storing different types of data. Querying such a large database from many different perspectives is a nontrivial task. Additionally, database transactions over the web, internet commerce, security and distributed many tier application architecture are also posing demand for new technology solutions. This invention relates to these specific technology needs.

2. Description of the Prior Art

Information technology is shifting towards multi-tier solutions. In the last decade client/server computing paradigm began with the idea of separating database management from applications. The design of relational model was primarily oriented towards data independence from the application perspective, by putting the databases on a shared server. The referential integrity was maintained in the database server rather than in the application logic. The communication mechanism involved SQL calls to travel from clients to server. However, two-tier client/server model does not scale well to support large numbers of users, high transaction volumes and unpredictable workloads of internet applications. New application architecture is distributed and component oriented to adapt to rapid changes in business and technology. Emerging application architectures are multi-tiered, involving thin clients (for example, browsers requiring no application installation or support), application servers to manage the business logic and data sources on various platforms. A component oriented architecture will easily integrate legacy, current and emerging technologies. Seamless integration and communication among various components requires extensive infrastructure or middleware architecture. This middle-tier is called various names: transaction server, application server, component server and business rule server. The basic abilities for this middle tier include scalability, adaptability, recoverability and manageability.

Web is the computing platform of the future as more platform independent applications being distributed over the web. As web evolves, there will be more dynamic information retrieval and electronic commerce where the middle tier software should support high volume secure transactions. Internet communications are mainly based upon HTTP (Hypertext transport protocol), CGI (Common gateway interface), IIOP (Internet inter ORB protocol) and JDBC (Java database connectivity). HTTP is the main communication mechanism among web browsers and servers. HTTP is a stateless protocol which implies that there is no way for the client and the server to know each other's state. Database operations such as scrolling over result sets or updating tables needs maintenance of system and transaction state. Since web is stateless, each transaction consumes time and resources in the setup and closing of network and database connections. For large online transaction processing applications, this overhead will be significant. CGI scripts are used to create new HTML (Hypertext mark up language) pages for static data access from databases. This is also stateless. JDBC is an application programming interface (API) for Java. It provides synchronous communication mechanism to most relational databases though a common API.

Internet inter ORB protocol (IIOP) is a dynamic invocation interface for the web. hOP is the most promising protocol. This protocol maintains the session between the client and the server objects until either side disconnects. It provides persistent connectivity over the web for distributed objects. Common Object Request Broker Architecture (CORBA) specifies the Object Request Broker (ORB) that allows applications to communicate with one another no matter where they reside on the web. The IIOP specification defines a set of data formatting rules, called CDR (Common Data Representation) which is tailored to the data types supported in the CORBA interface definition language (IDL). Using CDR data formatting rules, the hOP specification defines a set of message types that support all of the ORB semantics defined in CORBA. hOP specification requires that object request brokers send messages over TCP/IP connection, a standard connection oriented transport protocol. Moving from HTTP to IIOP will be transparent to end users, except for the fact that with IIOP the applications will become more sophisticated and have better performance. As web related CORBA standards are progressing, there is going to be standard URL formats for object references and requests. This provides less sophisticated users accesses to powerful object oriented services through the web.

Uniform resource locators representing references to CORBA objects can be treated as complex values for abstract types. URLs are currently used to reference web objects like text, image, sound etc. on the web. URLs are frequently embedded in HTML pages where a browser can navigate through the resource locator to find and manipulate web objects. By extending the use of URLs to represent CORBA objects (more specifically CORBA business objects) and embedding such URLs as attribute values in tables or other hypertext documents will make CORBA objects to behave like uniform web entities like text, image, audio etc. A browser can navigate through such an URL representing CORBA object and apply business logic to retrieve computed values after querying a relational database dynamically. This capability to store and manipulate distributed CORBA and web objects represented in the form of URLs leads to interesting possibilities for databases and middle tier software.

In middle tier application server, certain features are necessary. These common features are scalability, security, transaction management, concurrency and serialization, state management with persistence, exception/fault resolution, composite object creation with multiple components, object life cycle management including transparent persistence, dynamic location of objects and referential integrity. These capabilities are also the essential ingredients of a relational database server. Relational database management system deals with transactions, concurrency, recovery, fault tolerance, security etc. A relational database server provides almost all the necessary services and capabilities necessary for an application server. There is potential possibility for defining abstract types with CORBA business objects located by URL references over the web and then storing URL references in an object oriented relational database which defines and maintains abstract attribute types. Universal relational databases supporting object definitions are currently available as products. Such databases with proper modeling, extensions and modifications can address the needs for multi-tier transaction and application model for the web.

A database schema is the type description for the tables and attributes. Such a schema can be partitioned over the web in such a way that disparate business logic and business objects can exist with relevant data and relational views over the web. Unifying the object paradigm and relational model paradigm is the mainstream effort across the industry. Unified model for distributed relational databases integrated with object model is the key to many storage and manipulation issues for the web objects.

Universal relational database servers are available from different database vendors to offer general extensibility. One can extend types of attributes in tables and integrate routines defined by users written in high level programming languages. A data type is a descriptor that is assigned to a variable or column indicating the type of data that it can hold. The data type system of Universal Server handles the interaction with the data types. To specify a data type, the universal server needs to determine the following: (1) What layout or internal structure can the database server use to store the data type values on disk? (2) What are the operations (such as multiplication or string concatenation) applicable to a specified data type? (3) What are the corresponding access methods, the database server should use for data types? An access method defines how to handle the following. (a) Storage and retrieval of a particular data type in a table (a primary access method), (b) Storage and retrieval of a particular data type in an index (a secondary access method).

One such universal server available as a product offers the facilities of user defined routine. A user-defined routine (UDR) is a routine that a user creates and registers in the system catalog tables and that is invoked within a SQL statement or another routine. A function is a routine that optionally accepts a set of arguments and returns a set of values. A function can be used in SQL expressions. A procedure is a routine that optionally accepts a set of arguments and does not return any values. A procedure cannot be used in SQL expressions because it does not return a value. An UDR can be either a function or a procedure. The ability to integrate user defined routines and functions is the extensibility feature offered by universal servers.

A database schema in a universal server can contain clusters, database links, triggers, stored procedures, indexes, tables, views, snapshot logs, packages, object types, object tables, object views and other definitions. Schema objects or parts of schema objects can be local or remote. This means that it is possible in some universal servers to access objects or parts of objects from a schema other than the local schema owned by the user. It should be noted that one must be granted privileges to refer to objects in other schemas. By default any object or part of object is referred to user's own schema. The syntax for remote schema object reference is schema.object.part@dblink where dblink qualifier allows the user to refer to an object in a database other than the local database. This specific syntax for remote database referencing is supported by a specific database manufacturer's universal server distributed option. One can create a database link with the CREATE DATABASE LINK command. The command allows one to specify the name of the database link, a connect string to access the remote database and a user name/password to connect to it. This information goes to the data dictionary. This facility for accessing schema and objects in remote databases is possible only within the distributed framework offered by a specific database vendor. User defined routines or functions cannot be applied to such remote schema objects. In another vendor's universal database, virtual table interfaces are allowed to extend the sources of data available to users by adding new access methods. One type of access method is a gateway used by the database server to access data stored inside a source that is external to the server. Gateways are intended to unify all existing heterogeneous data distributed throughout an organization. One can access other vendor's database tables, data stored in sequential files and remote data stored across a network. However, these access methods are limited to tables only and it is not possible to send a query to such remote data sources.

Data types as mentioned earlier are always defined for columns in a table in a universal relational schema. Types can be built-in or user defined. Internal or built-in data types can be VARCHAR (variable length character string having a maximum size bytes), CLOB (a character large object of maximum size limit containing single byte characters), BLOB (a binary large object with a maximum size), BFILE (pointer to large binary file stored outside the database) etc. Also for one of the vendor's database product, internal large object (LOB) data types may be included in one of these categories and can store data such as text, image, video, spatial data, etc. Internal LOB columns contain LOB locators that can refer to out-of-line or inline LOB values. Selecting a LOB column value returns the LOB locator and not the entire LOB value. Different operations in the form of packages and functions are performed through these locators. Multiple LOB data type columns can be defined in a table and all possible SQL operations are possible over such tables and attributes. LOB locator can be stored in the table column, either with or without the actual LOB value. BLOB and CLOB values are stored in separate table spaces and BFILE data is stored in an external file on the server. These type definitions are however limiting LOB within the database server space and cannot go to different databases at different locations on the internet. The concept of LOB locator is therefore not generic for referencing any kind of web objects at disparate locations.

User defined types are also currently supported by different universal servers from different vendors. User defined types use internal built-in types and other user defined data types as the building blocks of types that model the structure and behavior of data in applications. Usually commands like CREATE TYPE, CREATE ROW TYPE, CREATE OPAQUE TYPE etc., are used to create an object type, nested table type and other complex user defined types. These types can be associated with operations or methods in order to operate on the instances of those types. An object identifier (OID) allows the corresponding object to be referenced from other objects or from relational tables all in the same server. A built-in data type called REF represents such reference in one of the available universal servers. REF is a container for an object identifier and points to an object. Content of REF can be replaced with a reference to a different object. A table can have top-level REF columns or can have REF attributes embedded within an object column. In general, if a table has a REF column, each REF value in the column could reference a row in a different table. The scope of such references is restricted. These object references can be used to refer to view type (representing a query) or any other user defined types. These references are limited to the data and object spaces within a server and cannot go to any object or any other database on the web.

As described above there is a clear need in the art for efficient relational database management systems to a) support distributed object paradigm for business application logic and b) support heterogeneous data over the internet. There are further needs for universal framework for internet transactions, security, various access techniques and object support in SQL for manipulating legacy databases.

SUMMARY OF THE INVENTION

The present invention solves the aforementioned deficiencies of the prior art and solves other problems that will be understood and appreciated by those skilled in the art upon reading and understanding the present specification. It is a primary objective of the present invention to provide a mechanism for representing and manipulating heterogeneous objects in relational databases over the internet. These objects include business application logic applied to results of queries from other relational databases or multimedia web objects like text, audio, video etc.

In one embodiment, Uniform Resource Locators are described to locate remote relational schema or other object definitions. Uniform Resource Locators are currently used over world wide web to reference any kind of object (text, image, audio, HTML pages etc.) anywhere on the web. On the other hand there are universal relational database servers using database links for remote distributed databases and object pointers (REF) to reference any kind of object within the database server. This invention extends these prior arts by using Uniform Resource Locators (URLs) in relational databases to reference any kind of local or remote objects including other relational databases anywhere on the web. Operations and methods in the form of object packages for business application logic on the referred object can be defined using user defined types regardless of the location of the object implementation on the web.

In another embodiment, URLs are stored in table columns of relational databases as locators of web objects and component relational schema with Java classes distributed over the net. Java classes encapsulate or package business logic to be applied on relational data or other multimedia data. Types defined by users to represent attributes in tables involve packaged object definitions to encapsulate methods or operations. These operations are applied through Object Request Brokers. In this invention, internal transaction management services in relational database systems provide web transactional services applying business logic over any kind of data on the web. A uniform paradigm for multi-tier client/server without a middle tier application server is presented.

In another embodiment, comparison operators are definable to compare text, image and other web objects for equality, similarity, containment etc. and an index can be created using such operators for range access over heterogeneous web objects. It is also possible to manipulate parts of an object intelligently. Additionally, Java applets can be downloaded for decomposing one web object into many parts for secured transmission over the internet and then storing in a database.

In yet another embodiment, SQL queries uniformly manipulate disparate relational data and other complex web objects. So far SQL queries are limited to a specific relational database with a specific data dictionary (often called the meta data repository). Present invention uses URLs as locators for remote database objects and SQL queries uniformly manipulate local and/or remote database table, attributes and objects. A different paradigm for SQL query execution over multiple relational databases on the web is presented. In this proposed paradigm, the distinction between an application and a server is no longer present. A SQL query undergoes preparation phases where embedded object implementations are initialized. Components of the SQL query are extracted during this phase for sending to remote databases pointed to by URLs for further preparations. This preparation and initialization phase at multiple sites completes before the actual collaborative multi-level execution takes place.

DESCRIPTION OF THE PREFERRED EMBODIMENT

Figure 1:
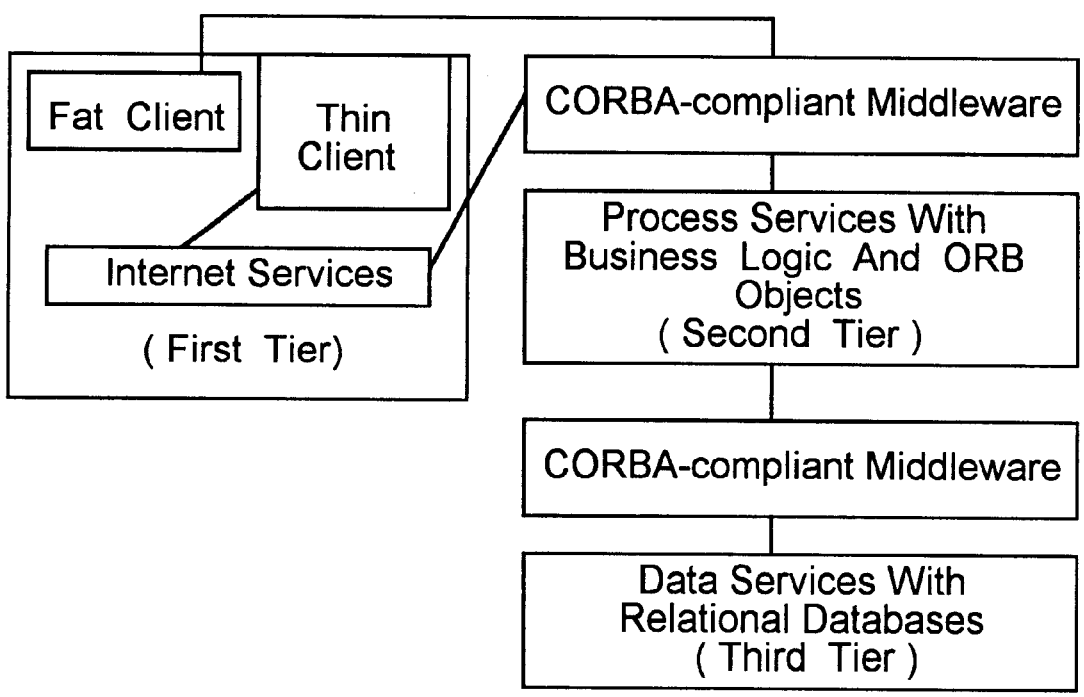
FIG. 1 is a block diagram showing the different stages in multi-tier client/server architecture in accordance with the invention.

The present invention will be explained in detail by way of a preferred embodiment thereof in conjunction with accompanying drawings herewith. Referring first to FIG. 1, there is shown multi-tier client/server architecture.

First tier in this architecture is a browser on the client site. A thin client needs very little software on the client computer. Any command or request for a service goes to web server for internet services shown here. Internet services are usually dealing with HTTP (hypertext transport protocol) to communicate with various web sites. Web servers talk to application servers where business specific application logic is maintained. A fat client talks directly to an application server. Request to application servers is made through Common Object Request Broker Architecture (CORBA) compliant services. Object request brokers (ORB) create a persistent link between client web server and application server for servicing object requests. Application server is usually the middle tier and databases are maintained in the third tier. Application server talks through CORBA services to communicate with third tier databases for executing SQL queries as shown in FIG. 1. Recent development of universal servers enhances the capability of relational database servers by putting application business logic inside the relational database server and thereby eliminating the middle tier. This invention is based on a similar notion.

Figure 2:
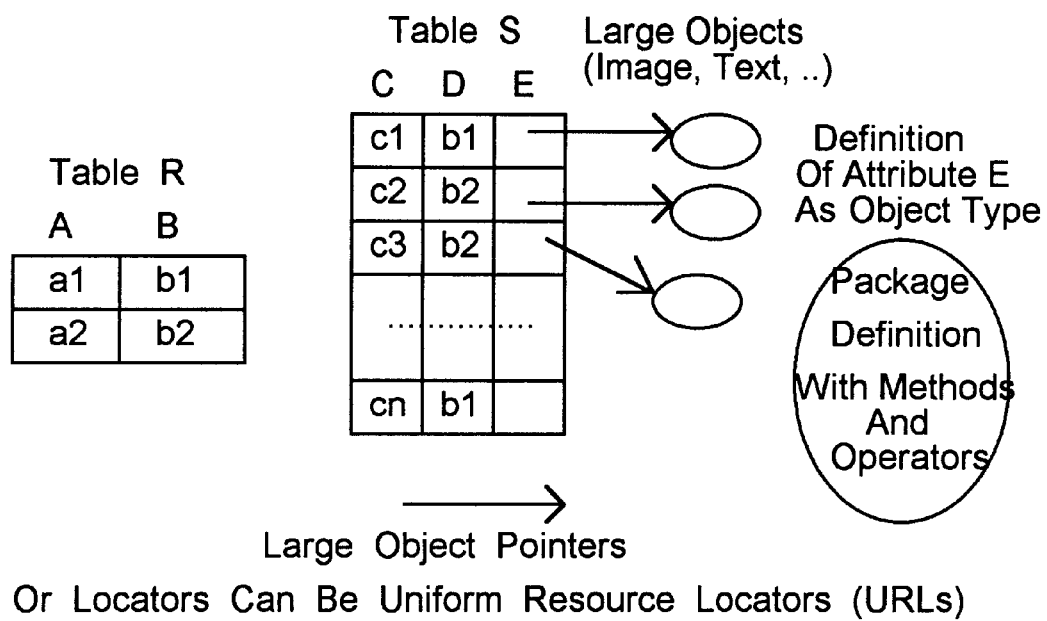
FIG. 2 is a relational database containing tables with foreign key relationship and user defined type definitions as focused in the invention.

A schema in a typical universal server is shown in FIG. 2 where two tables are defined as R (A, B) and S (C, D, E). Table S inherits the primary key B from R as foreign key in attribute D. Attribute E of table S is a non-simple type defined by the user. These user defined types are usually associated with an object or package containing method and operator definitions. Example of such an user defined type in one of the available universal servers is given below.

```
CREATE TYPE OrderType AS OBJECT
(    OrderId      number,
     LineItems    LineItemSetType,
     MEMBER FUNCTION TotalValue( )
                  RETURNS number,
     MAP FUNCTION MapOrder( )
                  RETURNS number     );
```

In the above definition, functions TotalValue() and MapOrder() are operations defined on data of the type OrderType. One can define a table using the type as shown below.

```
CREATE TABLE PurchaseOrder
(    POnumber  number,
     POrder    OrderType  );
```

SQL query over the table PurchaseOrder may look like the following example.

```
SELET P.POrder.TotalValue( )
    FROM PurchaseOrder P;
```

Syntax for creating user defined type with methods and operators varies from product to product. In another universal server the syntax is as following.

```
CREATE ROW TYPE Claim
(    Claim_Seq   INTEGER,
     Claim_Id    User_Type_Cid );
CREATE OPAQUE TYPE User_Type_Cid
(    INTERNALLENGTH = VARIABLE,
     MAXLEN = 80        );
CREATE FUNCTION lessthan
         (User_Type_Cid, User_Type_Cid)
         RETURNS boolean
         EXTERNAL NAME
         'btree.so (User_Type_Cid_lessthan)'
         LANGUAGE C NOT VARIANT ;
CREATE FUNCTION equal
         (User_Type_Cid, User_TypeCid)
         RETURNS boolean
         EXTERNAL NAME
         'btree.so (User_Type_Cid_equal)'
         LANGUAGE C NOT VARIANT ;
```

There are many such method and operator definitions in the form of functions over the type. The second syntax described above encodes a function name, parameters to the function, return type for the function, external location and external name for the function etc. External name/location specifies the software object containing the function implementation.

This invention uses Java language to implement such user defined packages with methods and operators. Java is a popular object oriented language defining classes, inheritance, methods, constructors and operators. This invention specifies in a 'CREATE type' definition, the name for a Java class which implements a set of functions as methods and operators for that type. A general type definition for attribute E in FIG. 2 is shown below.

```
CREATE TYPE LargeImage As LI.class
(    Image_Ref    LOB_locator;
     Image        TypeOfImage,
     FUNCTION Fname1 (Image)
              RETURNS number,
     FUNCTION Fname2 (Image, Image)
              RETURNS number,
     FUNCTION Fname3 (Image, Image )
              RETURNS number,
                                  . . . );
```

In the above definition LI.class is the Java class implementing the instance variables and method interfaces defined in the LargeImage type definition. The variables defined in CREATE type definition are implemented in terms of Java instance variables in LI.class. Implicit conversions from Java language variable definitions and relational database definitions are provided in the implementation. The large image object can be manipulated, retrieved, updated and compared using the functions defined in the type definition and implemented in Java class. The Image_Ref variable has a type of LOB_locator defined as a large object locator. In this invention, such locators are URLs (uniform resource locators) pointing to local or remote web objects on the internet.

Uniform Resource Locator (URL) can be thought of as a networked extension of the standard filename concept where one can point to a file name in a directory on any machine on the internet. URLs point to queries, documents stored deep within databases etc. An example file URL in a typical FTP server is shown below.

file://ftp.servername.com/files/name.txt

URLs pointing to Usenet newsgroup (say, "rec.gardening") is shown below.

News://news.servername.com/rec.gardening

A file called "foo.html" on HTTP (HyperText Transport Protocol) server in directory "/files" corresponds to this URL.

http://www.servername.com/files/foo.html

This invention uses the notion of URL to point to a database schema on the internet and a table (which may also be a virtual table or a view) belonging to that schema. Syntax for such URL is shown below.

Rdms://www.servername.com/SchemaName

This URL signifies a relational database management system on the world wide web at the specified server. SchemaName is the name of the schema created and maintained under the database on the server. Following the SchemaName in the URL, one can add a table or a view name or a query to retrieve or update data.

This invention extends the possibility of defining a view type. A view type in this invention is defined as shown below.

```
CREATE VIEW view_name
    OF TYPE view_name_t
 SELECT  name1, name2
    FROM table_name1 t1, table_name2 t2
    WHERE t1.col1 = t2.col2
                AND t1.name1 > 100 ;
```

A view type definition thus encapsulates a query in the form of a type that is usable in another package as shown below.

```
CREATE TYPE App_name As APP.class
(   Tran_id     number,
    Q_type      view_name_t,
    FUNCTION Fname1 (Q_type)
                RETURNS number,
    FUNCTION Fname2 (Q_type, Q_type)
                RETURNS number,
    FUNCTION Fname3 (Q_type, Q_type)
                RETURNS number,
                        . . . );
```

In this package definition, parameters to methods and operators in the form of functions are of the view type. A view results in a set of records after materialization (query execution). This record set is then used to find new values and results by applying the functions defined in the package. This way, we may have several packages using view types in local and remote locations. A remote view type existing in a schema at a remote location on the net may be pointed to by an URL.

Figure 3:
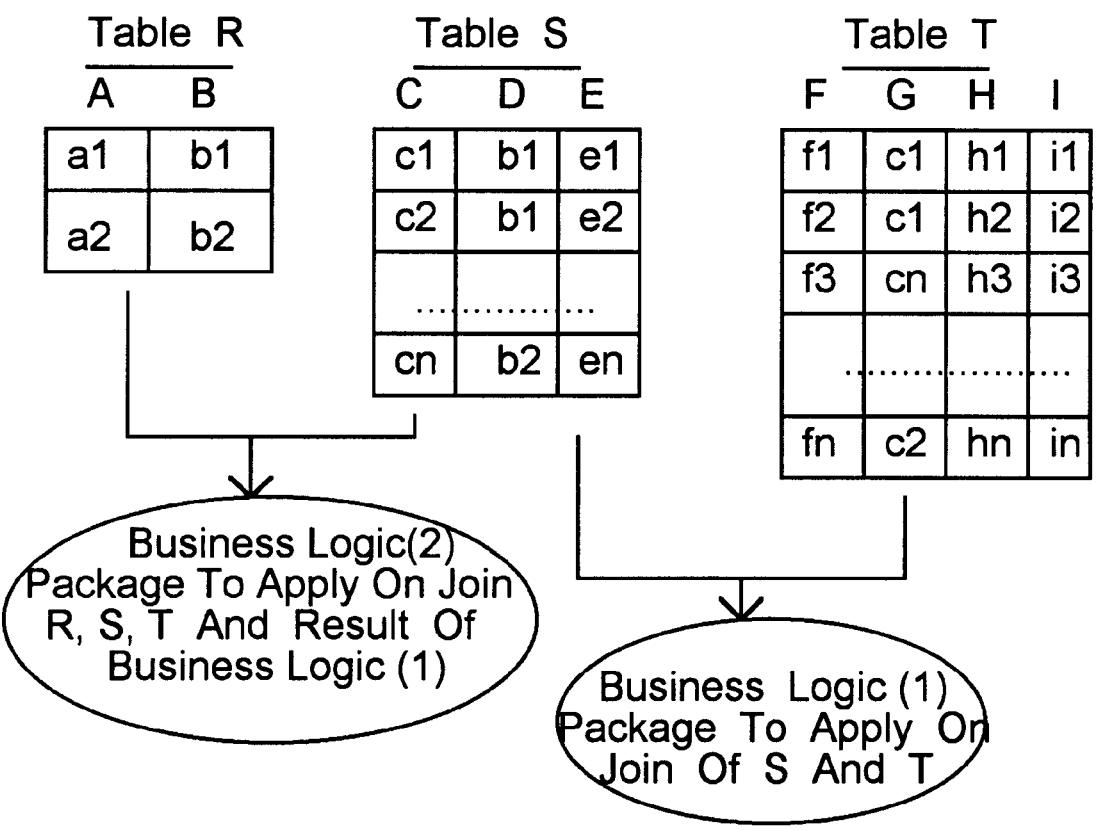
FIG. 3 shows relational database schema definition with tables and business logic package description in accordance with the invention.

FIG. 3 shows a diagram for a relational database schema which contains three tables R(A, B), S(C, D, E) and T(F, G, H, I) where attribute D in table S is a foreign key inherited from table R referencing primary key B in R and attribute G in table T is a foreign key inherited from table S referencing primary key C in table S. A query over these three tables involves relational operations constructing different types of record sets. An application program written for a specific business is a processing logic or business logic over such record sets constructed by relational queries. Certain business logic can embed another business logic over a subset of records constructed by queries. In FIG. 3, business logic (1) is applied to a result of join operation over tables S and T. Business logic (2) is applied over a join of all three tables along with nested application of business logic (1).

Figure 4:
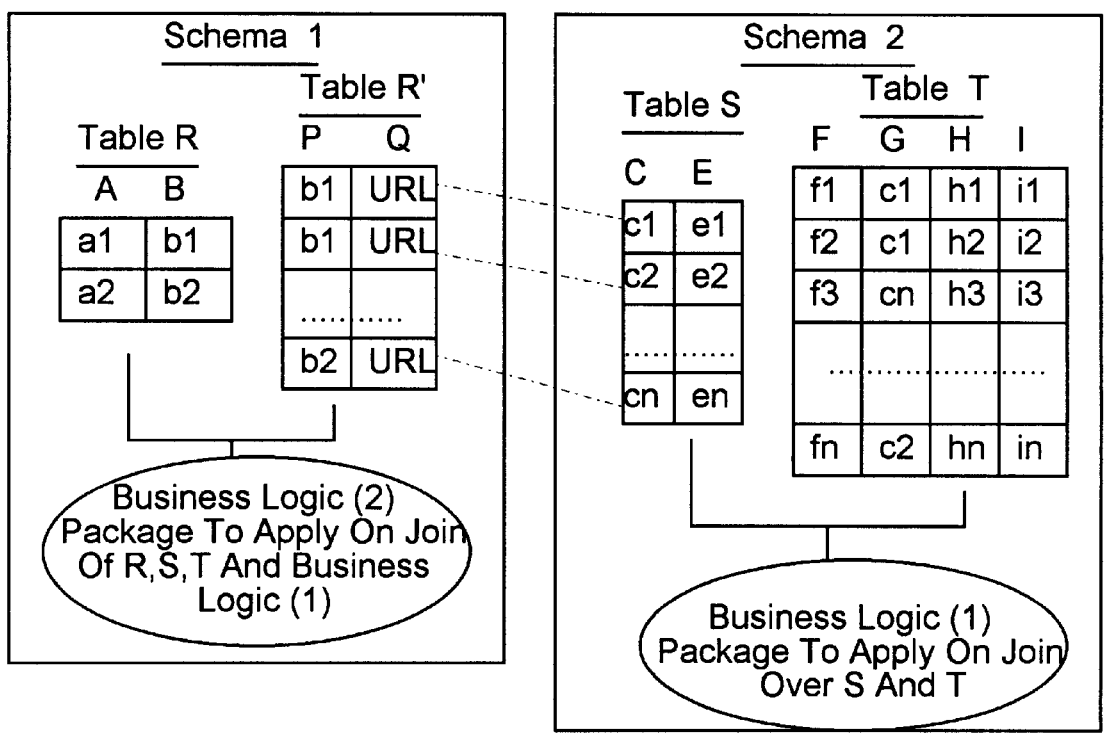
FIG. 4 shows two relational database schema definitions with business logic and uniform resource locator links in accordance with the invention.

FIG. 4 shows a partitioning of the schema in FIG. 3. Schema 1 and Schema 2 are two separate definitions based on the business logic to apply on constructed record sets. Schema 1 contains two tables R(A, B) and R'(P, Q). R(A, B) is the same table R in FIG. 3. R'(P, Q) is a new table where P is a foreign key inherited from table R referencing its primary key B and Q is URL of records in table S in Schema 2. Table S(C, D, E) in FIG. 3 is partitioned into two tables R'(P, Q) and S(C, E) and placed in Schema 1 and 2 respectively in FIG. 4. Attribute Q in table R' acts as the URL for the primary key attribute C of table S(C, E) in schema 2. Separation of schema 1 and schema 2 distributes the application program component executions. The business logic (2) in schema 1 is applied in steps, first on a join over tables R and R' to do partial computation and to get the URLs in attribute Q. Then these URLs are sent to schema 2 to select the records corresponding to the primary key in table S followed by a join with table T. After that business logic (1) is applied over the resulting record set and the result is sent back to schema 1 for completion of processing of business logic (2). A single schema in FIG. 3 needs both business logic (1) and (2) to be maintained and executed at the same location on the net. FIG. 4 shows how a distributed execution model can evolve by partitioning the schema. Such a distributed computing environment is a fundamental requirement for a multi-tier client/server model over the internet.

Figure 5:
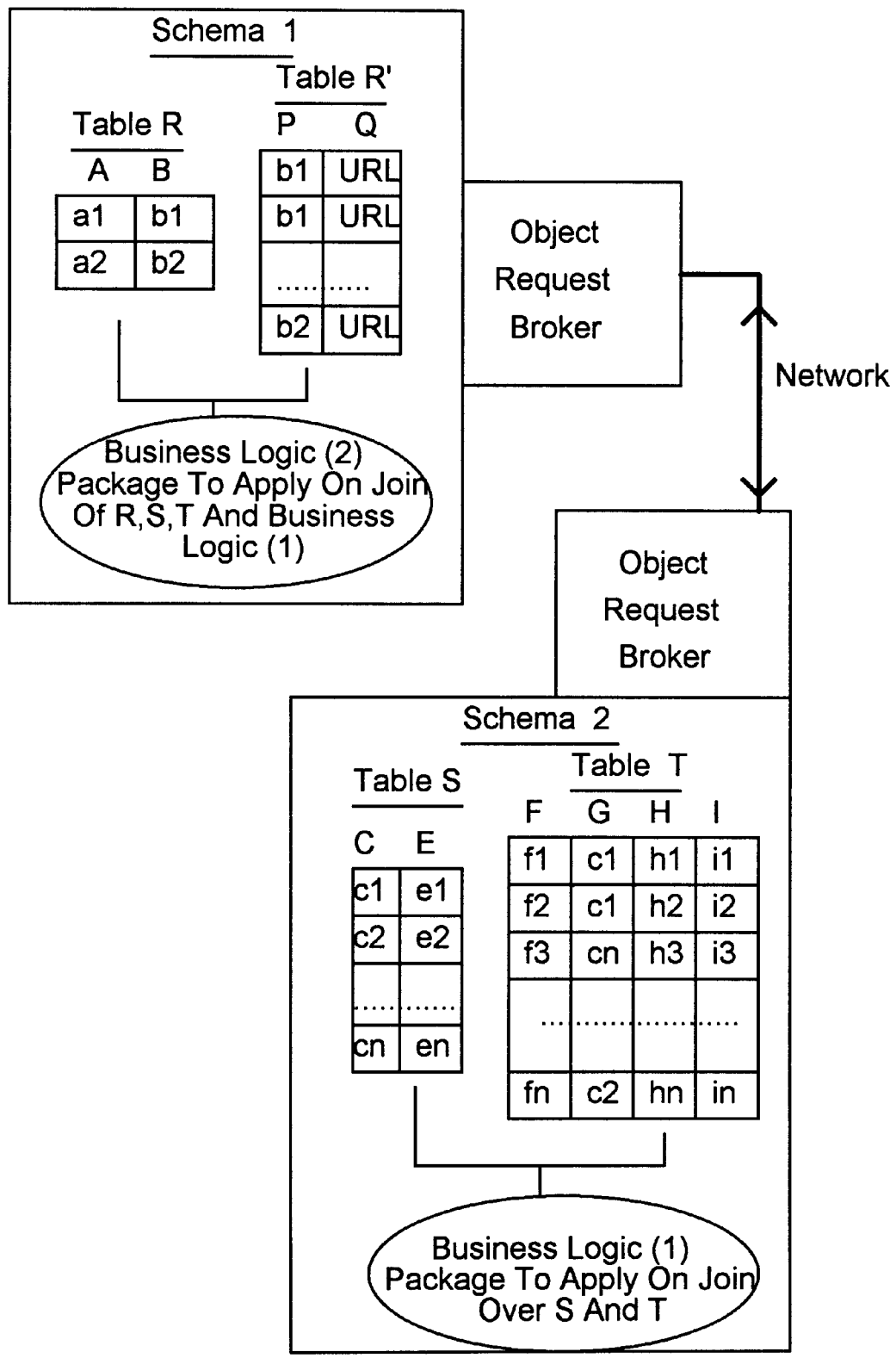
FIG. 5 shows two relational database schema definitions for further understanding of the concept shown in FIG. 4.

FIG. 5 shows how CORBA (Common Object Request Broker Architecture) and schema partitioning can seamlessly integrate. Object request brokers communicate with each other using IIOP (Internet Inter ORB Protocol) establishing persistent connectivity over program components manipulating data in schema 1 and schema 2 at two different locations on the net. Table R' in schema 1 can be seen as a view cache. A view cache is a relation (often binary) like an index to maintain join information over two or more tables. In schema 1, table R' maintains the foreign key/primary key relationship in a join over tables R and S (S being in schema 2). This special table R' maintains the referential integrity over tables in schema 1 and schema 2. This invention incorporates information exchange over the internet for maintaining such referential integrity. Whenever update, insert or delete operations take place over table S in schema 2, a log of all such operations corresponding to the primary key C will be sent to schema 1 for updating table R'. These exchanges may be implicitly done by special service packages using object request brokers. This invention of the disparate model thus needs to locally maintain the dependency information across various schema components over the web for proper consistency.

Figure 6:
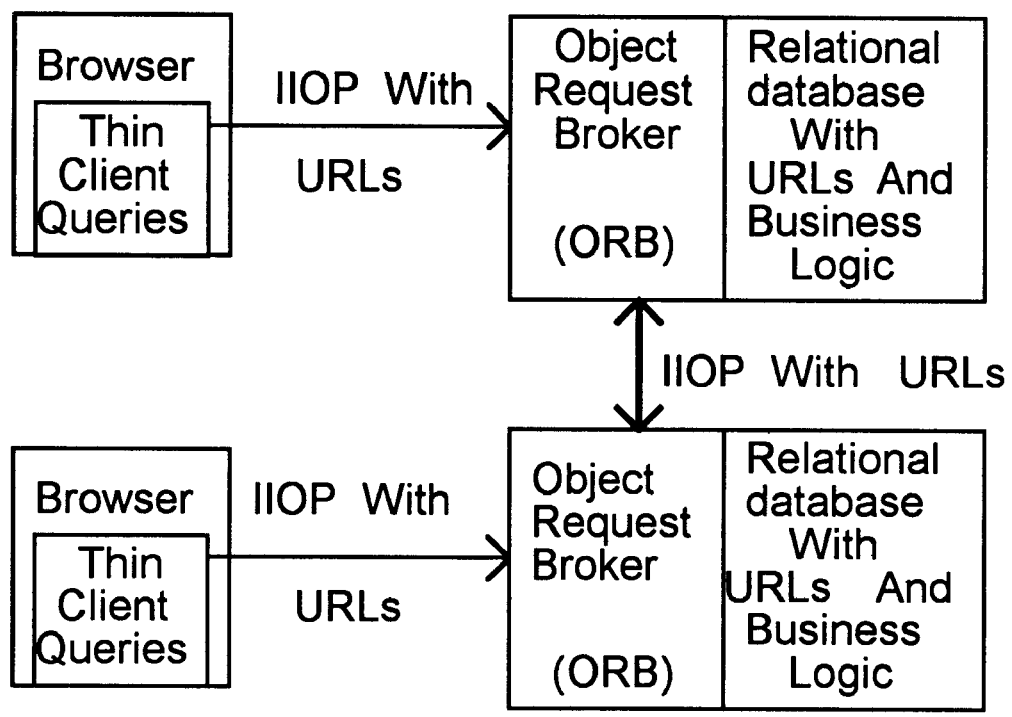
FIG. 6 is a block diagram of distributed computing with component relational databases over the internet in accordance with the invention.

FIG. 6 is a block diagram showing a multi-tier model described in this invention. Unlike the known three tier model, this invented model has no middle tier for business or application logic. Business logic or application programs along with relational data management system together act as a tier. The client site will consist of a thin or a fat client with ORB request carrying queries as well as URLs for locating and manipulating remote schema and program objects. This is the first tier. The requirements for a separate application server to maintain message queues, process logic and reliable infrastructure is completely eliminated in this invention. A relational database management system in the second tier is able to implement transaction processing, concurrency, recovery and other properties necessary for a safe, reliable execution paradigm for component application logic without requiring a separate tier.

Figure 7:
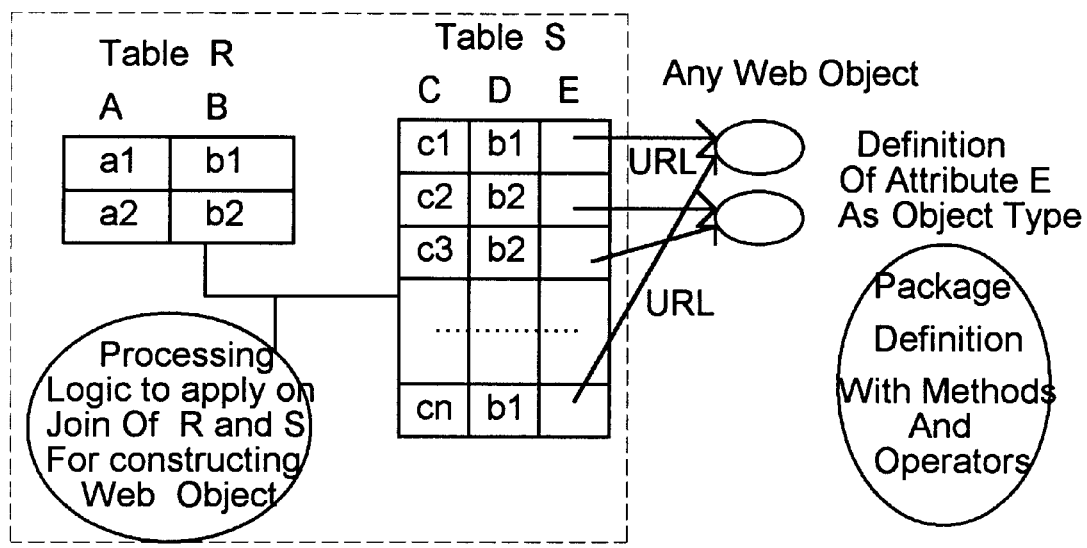
FIG. 7 shows a relational database schema with user defined type containing constructor logic for any web object in accordance with the invention.

To further illustrate the scope of the invention, FIG. 7 shows a schema with two tables R(A, B) and S(C, D, E) where attribute E in table S is an user defined type with a package definition implemented in Java. Attribute E, however, points to different components in the same web object, for example an HTML page. Processing logic in the form of a package is defined to operate over a join of table R and table S to construct the web object back and apply further manipulations over the object. For example, HTML pages consist of text, image, audio, video etc. Each such element can be separately located and manipulated. Automatic adjustment over the font sizes, readjustment of locations of text, image components and many other intelligent processing over web objects are possible in this invention by implicitly maintaining rules, triggers or stored procedures in a relational database management system which is not possible otherwise.

Figure 8:
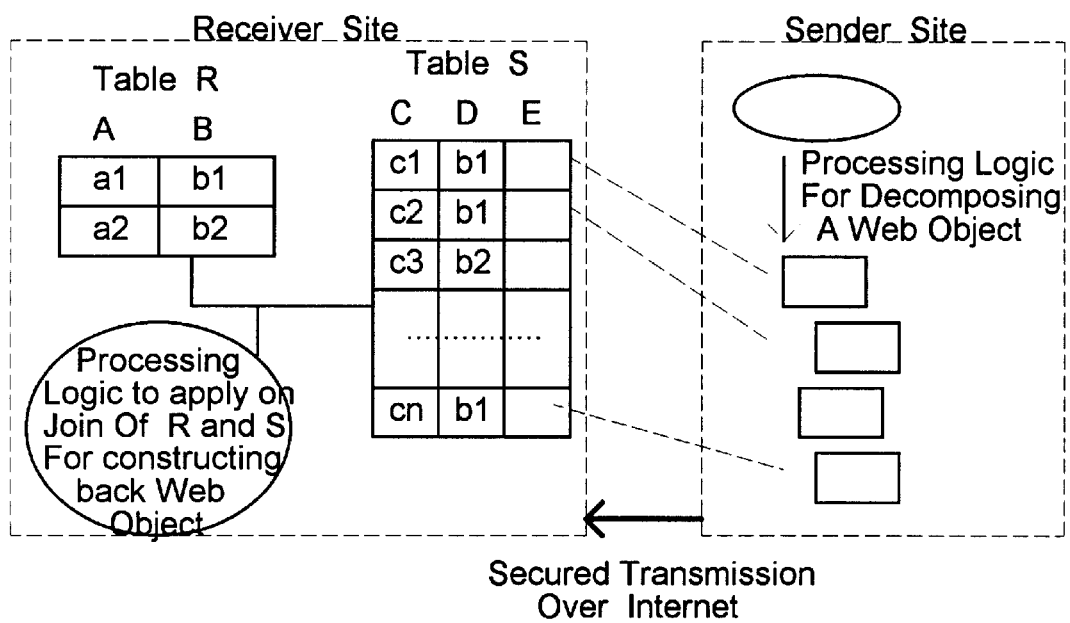
FIG. 8 shows a simple relational database schema with processing logic for decomposing any web object and then constructing it back at the server as discussed in the invention for internet security.

FIG. 8 shows possible intelligent processing of web objects for secured exchange of information. Electronic transaction and commerce on the internet are the current exploding activities. To avoid third party interceptions into some information strictly restricted for sender and receiver on the web, a generic way is to decompose the web object into several parts and then to send these scrambled parts over the net. At the receiver side these components are assembled back to form the original object. FIG. 8 explains how the issue of internet security is maintained by this invention. It shows a relational database schema with two tables R(A, B) and S(C, D, E) where attribute E is an user defined type representing various components of a web object. Here a Java applet (a small Java program) is maintained as a package and is downloaded by the sender before transmitting a web object. This Java applet decomposes this object into many pieces before sending it to the receiver. These components or pieces are received and stored as values of attribute E in table S. A processing logic in the form of a package defined in the relational database schema at the receiver site reassembles the object by a join over the tables R and S. A record in table R identifies a stored web object and joins with the components stored in table S. In addition, this invention provides an extended security structure. By maintaining several schema partitions over disparate locations on the internet, it enforces variant authorization and privileges for each of these schema components. By doing so it is possible to enforce very complex security schemes over the internet which is not possible in a single schema at a centralized database.

Figure 9:
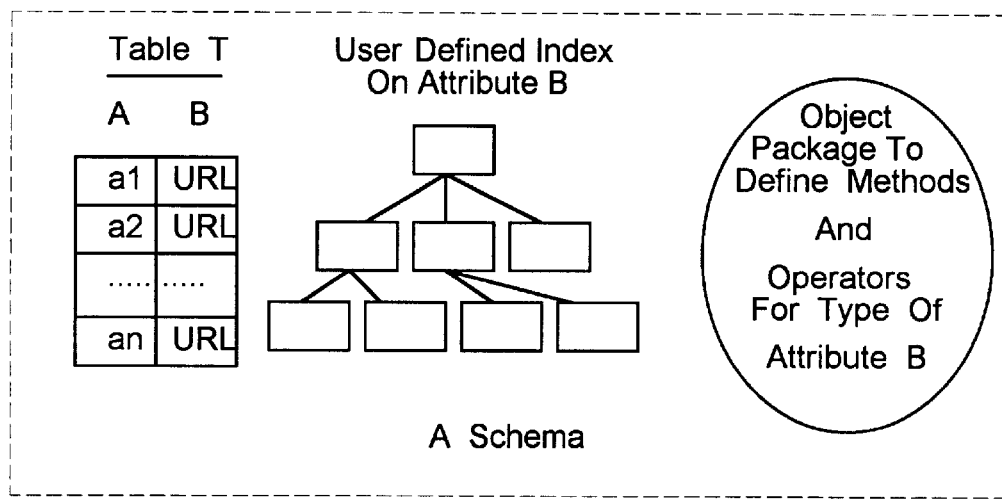
FIG. 9 is a simple relational database schema with user defined attribute type and an index built on the attribute type in accordance with the invention.

FIG. 9 shows a simple schema with a table T(A, B) where attribute B is an user defined type. A package with various methods and operators are defined for user defined type. Operators are functions to compare two items and return true or false values. Example of operator functions are 'less than', 'greater than', 'equal' etc. By using these operators, it is possible to build an index over the items in attribute B. Such user defined index creations and manipulations are possible in available universal database servers. As this invention considers creation and manipulation of such user defined index over user defined types, values in attribute B are Uniform Resource Locators to locate web objects on the internet. Operators can then be defined to compare such web objects located anywhere on the internet. An index created over such web objects will enable users to perform sorting, searching and various range accesses over remote or local web objects, not possible otherwise.

Figure 10:
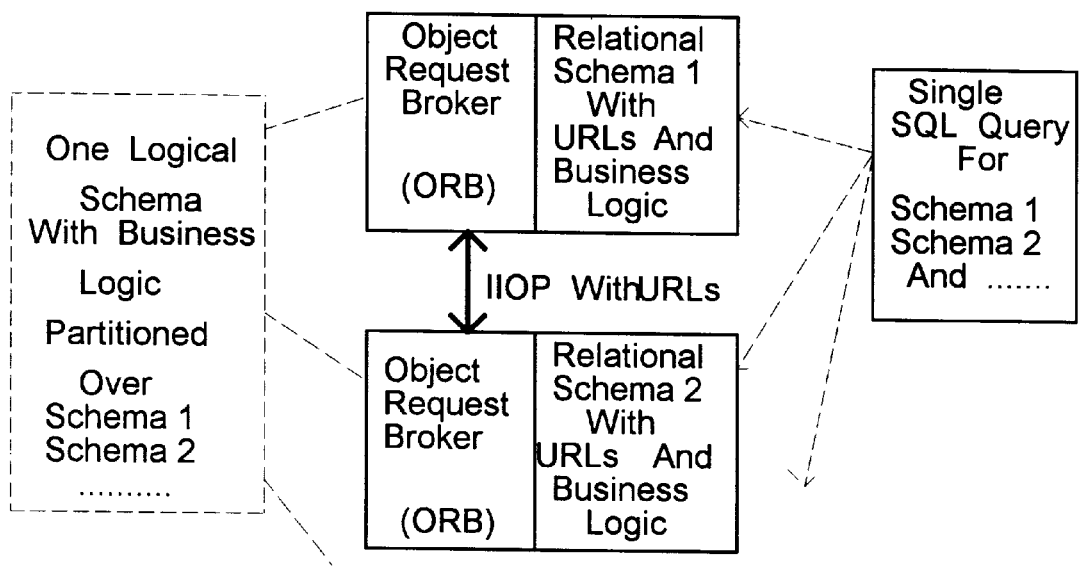
FIG. 10 is a block diagram to show a logical schema being partitioned into many relational database schema over the internet and a single query made over the logical schema as elaborated in the invention.

In this invention, a logical relational database schema is partitioned over many component schema. One logical schema distributes over many physical schema over the net. A SQL (Structured Query Language) query can be triggered against the logical schema without worrying about the physical distribution of the components. FIG. 10 shows a block diagram of a single logical relational database schema with business logic. It is partitioned over schema 1, schema 2 etc. As mentioned earlier, each such component schema consists of packages implementing relevant portion of the business logic for the data stored in that component database. Component schema and packages talk to each other through object request brokers. A query with table names, attribute names, method names from various component schema is resolved by successive preparations and collaborative executions at different sites over the internet. In practice, SQL query is resolved by first parsing and then executing relational operations over the data stored in tables. Parsing phase consists of recognizing table, attribute and package definitions stored in the data dictionary. This information stored in data dictionary is often called the meta data. This invention incorporates a preparation phase and an execution phase for each query. During the preparation phase, a query is parsed at each location to find whether the meta data stored here is sufficient to fully resolve the query. If not, then the unresolved portion is sent to the appropriate remote site. This phase includes loading of packages for user defined types along with necessary initializations. The second phase is the phase of execution where queries are executed, joins are performed and business logic is applied. Application of specific business logic may not be complete unless another embedded program finishes execution and sends the result back from another site. This results in collaborative executions across various sites. A preparation phase followed by an execution phase for SQL queries over disparate schema components presented in this invention is unique and not present in current relational database products.

Figure 11:
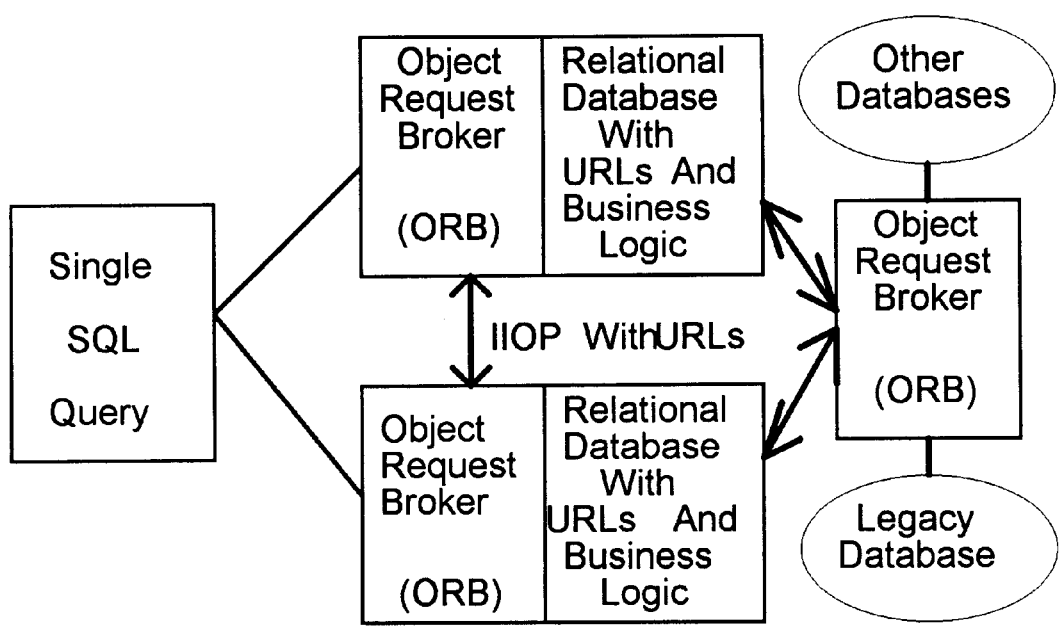
FIG. 11 is a block diagram to show a single SQL query made over a set of relational database schema in disparate locations along with legacy databases and existing central databases in accordance with the invention.

FIG. 11 shows a block diagram of relational databases with business logic at disparate locations along with legacy databases and other existing databases. This diagram clarifies the connectivity of legacy and other existing databases to collaborate with other schema components with business logic. Just like any other schema components, portions of an SQL query is sent to legacy data sources for execution. Since legacy or existing data sources do not support business logic inside schema definitions, portions of queries sent to such data sources do not involve user defined types and package definitions. Since object request brokers provide the persistent connectivity among various sites, it is possible to access and manipulate legacy and other existing data across different locations, while maintaining business logic in another remote component schema. This invention thus makes existing and legacy relational data to be viewed, extended and accessed through an object paradigm in SQL without any reorganization or replacement by current universal relational databases.

I claim:

1. In a network of computers over the internet, a multi-tier client/server system comprising of:
   A) Clients with browsers capable of triggering queries written in Structured Query Language (SQL) where these clients are connected to object request brokers in a Common Object Request Broker Architecture so as to make persistent communications with other object request brokers existing with relational database servers at multiple locations on the internet;
   B) Relational database servers with schema and business application logic defined in the form of object packages comprising:
      a) An user defined type creation for an attribute in a table where the type definition consists of variable definitions along with interface definitions for methods and operators on these variables;
      b) An user defined type creation for an attribute in a table where the type definition consists of a variable that points to a local or remote object on the internet;
      c) An user defined type creation for an attribute in a table where uniform Resource Locators (URLs) are used as values to locate any object on the web including relational databases;
      d) An user defined type creation for an attribute in a table where the type definition consists of a variable that can locate a view definition or any object in a local or remote relational database;
      e) Method and operator interfaces defined in user defined types implemented in Java classes,
   C) Executions of application logic in object packages on local or remote web objects performed by Object Request Broker services in Common Object Request Broker Architecture (CORBA).

2. A multi-tier client/server system defined in claim 1 wherein said client generates Structured Query Language (SQL) queries with embedded business application logic and such said client queries travel directly to said relational database servers without requiring a middle tier of application servers.

3. A system as defined in claim 1 wherein said clients and said relational database servers communicate through Object Request Brokers and Internet Inter ORB Protocols (IIOP) and wherein said relational database servers further communicate among themselves through IIOP using Uniform Resource Locators (UTRLs) for locating component schema and objects.

4. In a network of computers over the internet, multi-tier client/server system incorporating distributed business application logic with relational data at disparate locations comprising of:
  A) A logical schema for relational databases with tables, foreign key/primary key relationships, attributes with user defined types, business application logic in object packages;
  B) Many instances of component physical schema for relational databases distributed over disparate locations where these distributed schema instances are derived from one logical schema;
  C) A component physical schema with definitions of tables, foreign key/primary key relationships, user defined types with object packages and local or remote object locators consisting of:
    a) Uniform Resource Locators (URLs) used for locating remote schema or web objects;
    b) Relations as view caches to maintain relationships over foreign keys inherited from a table in the local component schema and primary keys of a table in a remote schema located by URLs;
    c) Relations as view caches to enforce referential integrity across component relational databases over the internet;
    d) Business logic in the form of object packages implemented in Java classes to incorporate processing logic over a join or other relational operations performed in a local component schema;
    e) View cache tables maintaining an attribute which is an user defined type with an associated object package implemented as Java class at a remote schema location and URLs as attribute values for locating primary keys in that remote schema;
  D) A multiple table join in a single logical schema performed as multiple partial joins at disparate component schema with persistent communications through Object Request Brokers maintained at each schema locations;
  E) Many levels of business logic applications on a complex join in a logical schema executed as cooperative processing of distributed business logic on partial joins in component schema at disparate locations communicating through Object Request Brokers.

5. A system as defined in claim 2 wherein said view cache carrying URLs further extends capabilities for locating any web objects or components of web objects and said object packages apply processing logic for constructing and manipulating these web objects.

6. A system as defined in claim 5 wherein said processing logic includes further intelligent capabilities of realigning and/or resizing component web objects, for example font size in text component, realignment of image component in HTML pages by using triggers, rules and stored procedures in relational databases.

7. A system as defined in claim 5 wherein processing logic in object packages further comprises means of enforcing security over web object transmission on the internet for electronic commerce and other applications by the steps including:
  A) Maintaining a Java class to decompose and apply other security specific processing logic on web objects such that this Java class can be downloaded implicitly to a sender location;
  B) Maintaining an object package in the form of Java class at the receiver location with database server to apply processing logic for constructing and manipulating components of web object such that an inverse of decomposition can be applied;
  C) Downloading Java class from client locations implicitly to decompose web objects and/or encrypt decomposed components before transmission over the internet so as to enforce security;
  D) Receiving and storing web object components as values of an attribute in a view cache maintained in the server;
  E) Applying processing logic after construction by relational operations over all the components stored.

8. A system as defined in claim 7 wherein said security over internet transactions further comprises means of adopting different privileges and access authorizations for users to retrieve and manipulate data stored at various component schema locations over the internet.

9. A system as defined in claim 5 wherein said view cache table with URLs locating web objects over the internet and said object package definition for methods and operators over such said web objects further comprises means of building an user defined index using operators over such web objects.

10. A system as defined in claim 9 wherein said index creation over web objects comprises means of making range accesses and other predicate based accesses.

11. A system as defined in claim 2 wherein said logical schema partitioned into said physical schema components comprises means of making and executing single SQL (Structured Query Language) query against the said logical schema irrespective of locations and distribution of physical schema components by the steps including:
  A) Keeping non-detailed meta data (information about relational data) for the logical schema at each component physical schema locations so that locations of other component schema are available for all tables, types and packages used in a query;
  B) Parsing a Structured Query Language (SQL) query at a physical component schema location to resolve definitions for tables, types and packages whatever is locally available and extracting portion of the query for sending it to other locations for preparation wherever the relevant meta data is available;
  C) Preparing fully a SQL query at multiple sites by successively parsing with locally available meta data and initializing any object packages used in attribute definitions in tables at each component schema location;
  D) Beginning execution only after complete preparations at all involved locations;
  E) Performing relational operations and executing application logic at each component schema location by collaborations through Object Request Brokers;
  F) Completing any business logic execution at a location by successive completion of other executions at other locations when there are dependencies and nested applications.

12. A system as defined in claim 11 wherein said preparation phase and said execution phase of an SQL query further comprises means of including internet locations with centralized legacy databases and other existing data stores.

13. A system as defined in claim 12 wherein said legacy databases and said existing centralized data stores carrying no object packages for business logic further comprises means of supporting SQL queries with embedded business logic against such legacy databases by defining object packages in other component schema locations.

14. A system as defined in claim 12 wherein said SQL queries with embedded business logic over said legacy databases and said centralized existing databases further comprises means of achieving extensibility and object orientation in relational data and SQL without any reorganization and replacement of existing systems.

* * * * *